United States Patent
Park et al.

(10) Patent No.: US 10,680,282 B2
(45) Date of Patent: Jun. 9, 2020

(54) LITHIUM-RICH ANTIPEROVSKITE COMPOUND, LITHIUM SECONDARY BATTERY ELECTROLYTE COMPRISING SAME, AND LITHIUM SECONDARY BATTERY COMPRISING SAME

(71) Applicant: LG CHEM, LTD., Seoul (KR)

(72) Inventors: Se Ho Park, Daejeon (KR); Chanyeup Chung, Daejeon (KR); Da Young Sung, Daejeon (KR); Minchul Jang, Daejeon (KR); Eunkyung Park, Daejeon (KR); Changhun Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 88 days.

(21) Appl. No.: 16/093,332

(22) PCT Filed: Sep. 21, 2017

(86) PCT No.: PCT/KR2017/010415
§ 371 (c)(1),
(2) Date: Oct. 12, 2018

(87) PCT Pub. No.: WO2018/062770
PCT Pub. Date: Apr. 5, 2018

(65) Prior Publication Data
US 2019/0245240 A1    Aug. 8, 2019

(30) Foreign Application Priority Data

Sep. 30, 2016  (KR) .................. 10-2016-0126258
Sep. 15, 2017  (KR) .................. 10-2017-0118438

(51) Int. Cl.
*H01M 10/52*    (2006.01)
*H01M 10/0562*  (2010.01)
(Continued)

(52) U.S. Cl.
CPC ........ *H01M 10/0562* (2013.01); *C01D 15/00* (2013.01); *C01D 15/04* (2013.01);
(Continued)

(58) Field of Classification Search
CPC ........... H01M 10/0562; H01M 10/052; H01M 10/0585; H01M 12/08; H01M 2300/008;
(Continued)

(56) References Cited

U.S. PATENT DOCUMENTS

| 9,246,188 B2 | 1/2016 | Zhao et al. |
| 2007/0148553 A1* | 6/2007 | Weppner ............ C01G 35/006 429/322 |

(Continued)

FOREIGN PATENT DOCUMENTS

| EP | 3 444 880 A1 | 2/2019 |
| KR | 10-2007-0014141 A | 1/2007 |

(Continued)

OTHER PUBLICATIONS

Li et., Angew. Chem. Int. Ed. 2016, 55, 9965-9968 (Year: 2016).*

(Continued)

*Primary Examiner* — Alexander Usyatinsky
(74) *Attorney, Agent, or Firm* — Birch, Stewart, Kolasch & Birch, LLP (57) ABSTRACT

The present invention relates to a Li-rich antiperovskite compound and the use thereof, and more particularly, to a Li-rich antiperovskite compound having a novel structure in which a dopant is substituted in a $Li_3OCl$ compound, wherein the dopant is substituted for an O site rather than an anionic Cl site, as known in the art, and an electrolyte using the same. The Li-rich antiperovskite compound has high lithium ion conductivity and excellent thermal stability, and thus can be applied as an electrolyte for lithium secondary batteries which are driven at a high temperature.

6 Claims, 8 Drawing Sheets

$Li_3ClO$ (51) Int. Cl.
| | |
|---|---|
| *H01M 10/052* | (2010.01) |
| *C01D 15/00* | (2006.01) |
| *H01M 12/08* | (2006.01) |
| *C01D 15/04* | (2006.01) |
| *H01M 10/0585* | (2010.01) |

(52) U.S. Cl.
CPC ..... *H01M 10/052* (2013.01); *H01M 10/0585* (2013.01); *H01M 12/08* (2013.01); *C01P 2002/30* (2013.01); *C01P 2002/54* (2013.01); *C01P 2002/72* (2013.01); *C01P 2006/40* (2013.01); *H01M 2300/008* (2013.01); *H01M 2300/0071* (2013.01); *Y02E 60/128* (2013.01)

(58) Field of Classification Search
CPC . H01M 2300/007; C01D 15/04; C01D 15/00; C01P 2002/72; C01P 2002/54; C01P 2006/40; C01P 2002/30; Y02E 60/128
See application file for complete search history.

(56) References Cited

U.S. PATENT DOCUMENTS

| | | | |
|---|---|---|---|
| 2013/0202971 A1* | 8/2013 | Zhao | H01M 6/185 429/323 |
| 2014/0113187 A1* | 4/2014 | Winoto | H01M 10/0525 429/189 |
| 2015/0364788 A1* | 12/2015 | Lu | H01B 1/06 427/597 |
| 2016/0293951 A1* | 10/2016 | Lim | H01M 4/505 |
| 2017/0025705 A1* | 1/2017 | Miara | H01M 10/0562 |

FOREIGN PATENT DOCUMENTS

| | | | |
|---|---|---|---|
| WO | WO 2012/112229 A2 | | 8/2012 |
| WO | WO 2012112229 | * | 8/2012 |
| WO | WO 2014150763 | * | 3/2014 |
| WO | WO 2015/128834 A1 | | 9/2015 |
| WO | WO 2015/130106 A1 | | 9/2015 |
| WO | WO 2016/131008 A1 | | 8/2016 |

OTHER PUBLICATIONS

Lu et. al. , American Chemical Society, Division of Energy and Fuels 2015,60(2),215, (Abstract) (Year: 2015).*
Zhao et. al. JASC 2012,194, 15042 (Year: 2012).*
2019503183,Decision_to_Grant_a_Patent_(Translated),Oct. 7, 2019 (Year: 2019).*
20170118438,Written_Decision_on_Registration_(Translated),Jun. 22, 2018 (Year: 2018).*
Braga et al., "Novel $Li_3ClO$ based glasses with superionic properties for lithium batteries", J. Mater. Chem. A, 2014, vol. 2, pp. 5470-5480.
Deng et al., "Rational Composition Optimization of the Lithium-Rich $Li_3OCl_{1-x}Br_x$ Anti-Perovskite Superionic Conductors", Chemistry of materials, 2015, vol. 27, No. 10, pp. 3749-3755. See abstract, and introduction section.
Hartwig et al., "Ionic Conductivities of Lithium-Halide-Based Quaternary Compounds", Solid State Ionics 3/4, 1981, pp. 249-254.
International Search Report (PCT/ISA/210) issued in PCT/KR2017/010415, dated Jan. 12, 2018.
Lü et al., "Li-rich anti-perovskite $Li_3OCl$ films with enhanced ionic conductivity", Chem. Commun., 2014, vol. 50, No. 78, pp. 11520-11522.
Zhang et al., "High pressure-high temperature synthesis of lithium-rich $Li_3O(Cl, Br)$ and $Li_{3-x}Ca_{x/2}OCl$ anti-perovskite halides", Inorganic Chemistry Communications 2014, vol. 48, pp. 140-143.
Zhao et al., "Superionic Conductivity in Lithium-Rich Anti-Perovskites", J. Am. Chem. Soc. 2012, vol. 134, pp. 15042-15047.
Zhu et al., "Sodium Ion Transport Mechanisms in Antiperovskite Electrolytes $Na_3OBr$ and $Na_4OI_2$: An in Situ Neutron Diffraction Study", Inorganic Chemistry, 2016, vol. 55, pp. 5993-5998.
European Search Report for Appl. No. 17856656.8 dated Jul. 5, 2015.
Lu, Z., et al, "Defect chemistry and lithium transport in $Li_3OCl$ anti-perovskite superionic conductors," Physical Chemistry Chemical Physics, Oct. 28, 2015, vol. 17, No. 48, pp. 32547-32555.

* cited by examiner

【Figure 1】

Li$_3$ClO

F-doped Li₃ClO

【Figure 4】

Na, F-doped Li₃ClO

[Figure 5]

Ba, F-doped Li₃ClO

LITHIUM-RICH ANTIPEROVSKITE COMPOUND, LITHIUM SECONDARY BATTERY ELECTROLYTE COMPRISING SAME, AND LITHIUM SECONDARY BATTERY COMPRISING SAME

TECHNICAL FIELD

This application claims priority to and the benefit of Korean Patent Application No. 10-2016-0126258, filed Sep. 30, 2016, and Korean Patent Application No. 10-2017-0118438, filed Sep. 15, 2017, the disclosures of which are incorporated herein by reference in their entirety.

The present invention relates to a novel Li-rich antiperovskite compound having an antiperovskite crystal structure, an electrolyte for lithium secondary batteries including the same, and a lithium secondary battery including the electrolyte.

BACKGROUND ART

With the current growing interest in environmental issues, a lot of research has been conducted on electric vehicles and hybrid electric vehicles that may replace vehicles, such as gasoline vehicles, diesel vehicles, and the like, using fossil fuels, which has been pointed out as one of main causes of atmospheric pollution. Although a nickel metal hydride secondary battery has been mainly used as a power source for such electric vehicles, hybrid electric vehicles, and the like, research on the use of lithium secondary batteries having a high energy density and discharge voltage, a long cycle lifespan and a low self-discharge rate has been actively conducted, and some of the lithium secondary batteries are on a stage of commercialization.

A carbon material has been mainly used as a negative electrode active material for such lithium secondary batteries, and the use of lithium metals, sulfur compounds, and the like is under consideration. Also, lithium-containing cobalt oxides ($LiCoO_2$) have been mainly used as positive electrode active materials, and the use of lithium-containing manganese oxides such as $LiMnO_2$ having a lamellar crystal structure, $LiMn_2O_4$ having a spinel crystal structure, and the like, and lithium-containing nickel oxides ($LiNiO_2$) is under consideration. Further, various materials such as liquid electrolytes, solid electrolytes, polymer electrolytes, and the like have been used as electrolytes.

The lithium secondary batteries have drawbacks in that an internal short-circuit phenomenon may occur due to low stability to heat at a high temperature (e.g., 90° C. or higher), and the batteries swell up and explode. Particularly, when a liquid electrolyte is used, leakage of the electrolyte may occur. For this reason, a solid electrolyte or a polymer electrolyte was presented as an alternative electrolyte, but no satisfactory lithium ion conductivity may be secured.

In recent years, compounds having a chemical structure such as $Li_3OBr$ or $Li_3OCl$, that is, a lithium-rich antiperovskite (hereinafter referred to as 'LiRAP') crystal structure, have been suggested. Because such compounds have very excellent lithium ion conductivity and are also stable at high temperature, the compounds have been researched as an alternative to next-generation electrolytes.

The antiperovskite crystal structure refers to a structure similar to perovskite, that is, a structure in which there are different positions between cations and other constituent elements in the crystal structure. The perovskite structure is generally represented by $ABX_3$, wherein A represents a monovalent cation, B represents a bivalent cation, and X represents a monovalent anion. In the antiperovskite structure ($ABX_3$), X refers to a cation such as an alkali metal, and A and B refer to an anion. Hundreds of different types of the perovskite and antiperovskite crystal structures are known depending on which atoms (or functional groups) exist on A, B and X, and also have different electrical characteristics in conductors, semiconductors, and non-conductors.

Xujie Lu et al. suggested $Li_3OCl$ as LiRAP, wherein the material has a high level of ion conductivity of $0.85 \times 10^{-3}$ S/cm at room temperature, and suggested that the material may be used as an electrolyte because the material has excellent stability at a high temperature due to its orthorhombic crystal structure having a tetragonal phase [Yusheng Zhao et al., Superionic Conductivity in Lithium-Rich Anti-Perovskites, J. Am. Chem. Soc., 2012, 134 (36), pp 15042-15047; US Patent Application No. 2013-0202971].

In the crystal structure such as LiRAP, a dopant is intentionally added as a foreign substance to enhance ion conductivity. In this regard, Yusheng Zhao et al. suggested that Br-doped $Li_3O$ ($Cl_{0.5},Br_{0.5}$) has an ion conductivity of $10^{-2}$ S/cm, the value of which may be higher than that of $Li_3OCl$ ($10^{-3}$ S/cm), and thus may be used as a solid electrolyte [Yusheng Zhao et al., Superionic Conductivity in Lithium-Rich Anti-Perovskites, J. Am. Chem. Soc., 2012, 134 (36), pp 15042-15047].

Similarly, Yusheng Zhao and M. H. Braga et al. suggested compounds having a (Ba, Li)$_3$OCl structure in which lithium ions are substituted with other metal ions, disclosing that the material may be used in batteries which need to be operated at a high temperature, such as metal-air batteries or all-solid-state batteries, because the material may enhance ion conductivity at room temperature and exhibits non-flammable characteristics at a high temperature.

Patent Document

Patent Document 1: U.S. Patent No. 2013-0202971 (Aug. 8, 2013) entitled "Anti-Perovskite Solid Electrolyte Compositions"

Non-patent Documents

Non-patent Document 1: Xujie Lu et al., Li-rich antiperovskite Li3OCl films with enhanced ionic conductivity, Chem. Commun., 2014, 50, 11520

Non-patent Document 2: Yusheng Zhao et al., Superionic Conductivity in Lithium-Rich Anti-Perovskites, J. Am. Chem. Soc., 2012, 134 (36), pp 15042-15047

Non-patent Document 3: M. H. Braga et al., Novel Li3ClO based glasses with supertonic properties for lithium batteries, J. Mater. Chem. A, 2014, 2, 5470-5480

DISCLOSURE

Technical Problem

Therefore, the present inventors have conducted research on a LiRAP compound such as $Li_3OCl$, designed a structure in which a dopant for substitution is not substituted for a Cl site but is substituted for an oxygen (O) site, and found that a compound having such a novel structure has high ion conductivity and excellent stability at a high temperature as well. Therefore, the present invention has been completed based on the facts.

Accordingly, it is an object of the present invention to provide a LiRAP compound having a novel structure.

It is another object of the present invention to provide the use of the LiRAP compound applied to lithium secondary batteries.

Technical Solution

To solve the above problems, according to an aspect of the present invention, there is provided a compound having a lithium-rich antiperovskite (LiRAP) crystal structure represented by the following Formula 1, 2 or 3:

$$Li_{3-x}ClO_{1-x}Hal_x \quad \text{[Formula 1]}$$

wherein Hal is F, Cl, Br, or I, and x is 0<x<1;

$$Li_{3-y-x}M_yO_{1-x}Hal_xCl \quad \text{[Formula 2]}$$

wherein M is Na, K, Rb, or Cs, Hal is F, Cl, Br, or I, and x and y are 0<x<1 and 0<y<2.

$$Li_{3-2y-x}M_yO_{1-x}Hal_xCl \quad \text{[Formula 3]}$$

wherein M is Mg, Ca, Sr, or Ba, Hal is F, Cl, Br, or I, and x and y are 0<x<1 and 0<y<1.

According to another aspect of the present invention, there is provided an electrolyte for lithium secondary batteries, which includes the compound having a lithium-rich antiperovskite (LiRAP) crystal structure represented by the following Formula 1, 2 or 3:

$$Li_{3-x}ClO_{1-x}Hal_x \quad \text{[Formula 1]}$$

wherein Hal is F, Cl, Br, or I, and x is 0<x<1;

$$Li_{3-y-x}M_yO_{1-x}Hal_xCl \quad \text{[Formula 2]}$$

wherein M is Na, K, Rb, or Cs, Hal is F, Cl, Br, or I, and x and y are 0<x<1 and 0<y<2.

$$Li_{3-2y-x}M_yO_{1-x}Hal_xCl \quad \text{[Formula 3]}$$

wherein M is Mg, Ca, Sr, or Ba, Hal is F, Cl, Br, or I, and x and y are 0<x<1 and 0<y<1.

According to still another aspect of the present invention, there is provided a lithium secondary battery including the electrolyte for lithium secondary batteries.

Advantageous Effects

A lithium compound having a novel crystal structure according to the present invention has high ion conductivity because the lithium compound is formed by replacing a dopant with an oxygen atom rather than a lithium cation. Because such a lithium compound is used as a solid electrolyte of a lithium secondary battery, the lithium compound can be useful in maintaining high ion conductivity even when the battery is driven at a high temperature, and satisfies all characteristics such as an electrochemically stable potential window, low electrical conductivity, high-temperature stability, low toxicity, and the like.

Particularly, the lithium compound can be used as an electrolyte in the field of secondary batteries which are operated at a high temperature, such as solid oxide batteries, all-solid-state batteries, lithium-sulfur batteries, and the like.

BEST MODE

Hereinafter, the present invention will be described in detail.

LiRAP Compound

A lithium-rich antiperovskite (LiRAP) compound provided in the present invention is a compound having a lithium-rich antiperovskite crystal structure. Specifically, the LiRAP compound has a structure in which a dopant is substituted in a basic crystal structure of $Li_3OCl$ to improve ion conductivity, that is, a structure in which the dopant is substituted for an O site rather than Cl as known in the art, preferably a chemical structure represented by the following Formula 1, 2 or 3:

$$Li_{3-x}ClO_{1-x}Hal_x \quad \text{[Formula 1]}$$

wherein Hal is F, Cl, Br, or I, and x is 0<x<1;

$$Li_{3-y-x}M_yO_{1-x}Hal_xCl \quad \text{[Formula 2]}$$

wherein M is Na, K, Rb, or Cs, Hal is F, Cl, Br, or I, and x and y are 0<x<1 and 0<y<2.

$$Li_{3-2y-x}M_yO_{1-x}Hal_xCl \quad \text{[Formula 3]}$$

wherein M is Mg, Ca, Sr, or Ba, Hal is F, Cl, Br, or I, and x and y are 0<x<1 and 0<y<1.

The LiRAP compounds of Formulas 2 and 3 are compounds in which a Li cation is further substituted.

Because the compounds of Formulas 1, 2 and 3 have ion conductivity (at 25° C.) of 10 to $10^{-10}$ S/cm and exhibit excellent thermal stability, the ion conductivity at a high temperature may be substantially maintained.

The LiRAP compounds of Formulas 1, 2 and 3 has a structure in which a halogen element such as F, Cl, Br or I, which is a dopant, is partially substituted for the O site, and thus has ion conductivity and thermal stability similar to or higher than conventional LiOCl compounds having a structure in which the dopant is not substituted.

In this case, the types of the dopant and the molar ratios represented by x and y have a direct influence on activation energy together with a band gap as will be described below. Here, because the molar ratios (i.e., a content of the dopant) eventually have an influence on the ion conductivity, the content of the dopant is preferably adjusted.

Preferably, when the molar ratio of the halogen element serving as the O dopant is too low, an effect of enhancing ion conductivity may not be secured. On the other hand, when the molar ratio of the halogen element is too high, a decrease in band gap and an increase in activation energy may be caused, resulting in degraded ion conductivity. Therefore, the halogen element is properly used in this molar ratio range. This is true for a Li-substituted metal, that is, a metal represented by "M."

A diffusion mechanism for doping by the dopant includes substitutional diffusion and interstitial diffusion. The substitutional diffusion refers to diffusion through a vacancy on the lattice, that is, diffusion by which an atom escapes from a lattice site (i.e., a substitutional site) and pushes into an interstitial site to form a vacancy and a dopant enters this vacancy. Also, the interstitial diffusion refers to diffusion by which a lattice jumps into an interstitial site. In this case, the interstitial diffusion causes atoms to be formed at a deep level in a semiconductor because the atoms are dispersed more rapidly and dispersed more deeply, compared to the substitutional diffusion.

The dopant provided in the present invention is doped by an interstitial diffusion mechanism. In the case of the interstitial diffusion, because atoms migrate from an interstitial site to another interstitial site, energy of heat treatment is required for migration of such atoms. Because a change in electronic state, that is, a change in crystal structure is caused by addition of the dopant, the band gap and activation energy of the material is eventually changed.

That is, the LiRAP according to the present invention has a predetermined energy level before the LiRAP is doped with the dopant, an energy gap (Eg), that is, a band gap exists depending on the interaction and active state of the atoms constituting the LiRAP. A vale of the band gap varies with a change in energy level of the LiRAP through doping by the dopant. The change in the band gap is typically highly affected by the type and concentration of the dopant. Typically, when an insulating material has a band gap of 3.0 eV or more, the insulating material has very low electrical conductivity. For example, the LiRAP has a band gap of approximately 5 eV, and the band gap of the LiRAP varies depending on the type of the dopant.

When Li or O is substituted with other elements, the band gaps tend to decrease with respect to the LiRAP. In this case, dopants having such a tendency of decrease in the band gap may be considered to be candidates for preferred dopants.

When certain dopants such as the halogen elements as shown in Formula 1, 2 and 3 are used, there is a small change in the band gap. Further, when Li is substituted with other metal ions, a change in the band gaps in Na and Ba tends to be slight.

The band gaps of the LiRAP compounds of Formula 1, 2 and 3 may be predicted through the following calculation.

Figure 1:
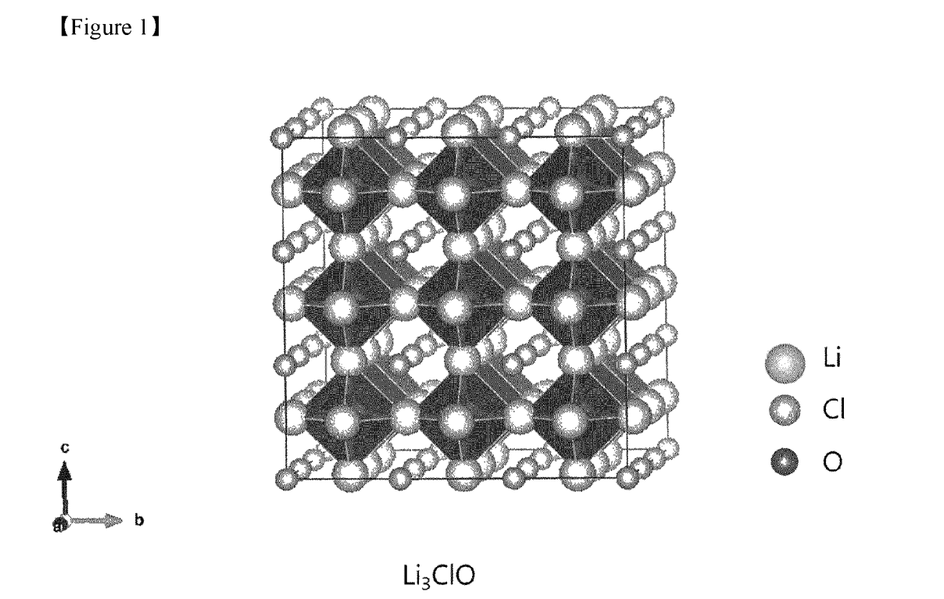
FIG. 1 is a schematic diagram showing a crystal structure of $Li_3OCl$.

FIG. 1 is a schematic diagram showing a crystal structure of $Li_3OCl$, that is, a schematic diagram of a crystal structure of $Li_{81}Cl-O_2$— having a 3×3×3 supercell crystal structure consisting of 135 atoms. Such a crystal structure is a structure in which there are large cations (A) at vertexes of a cubic unit lattice (8×⅛) and a small cation (B) at the center of the cubic unit lattice, and anions (X) at the centers of respective planes (6×½).

Figure 2:
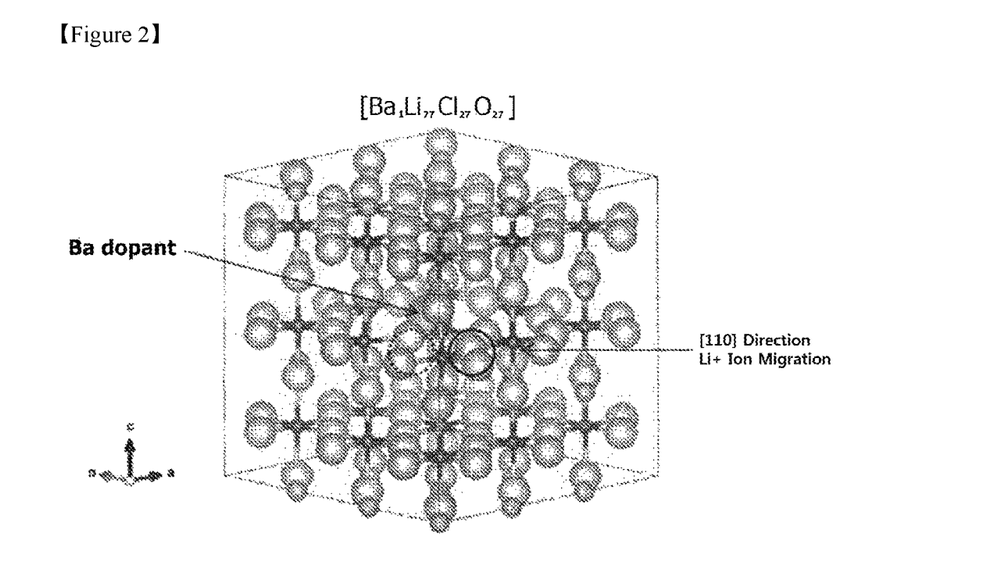
FIG. 2 is a schematic diagram showing a crystal structure in which Li is substituted with a Ba cation.

Also, FIG. 2 is a schematic diagram showing a crystal structure in which Li is substituted with a Ba cation.

Figure 3:
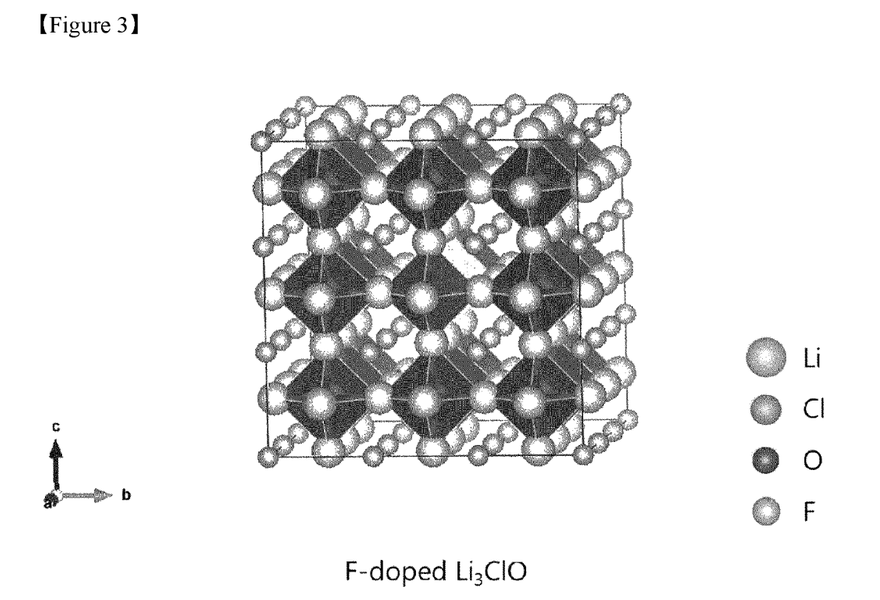
FIG. 3 is a schematic diagram showing a crystal structure in which O is substituted with an F anion.
Figure 4:
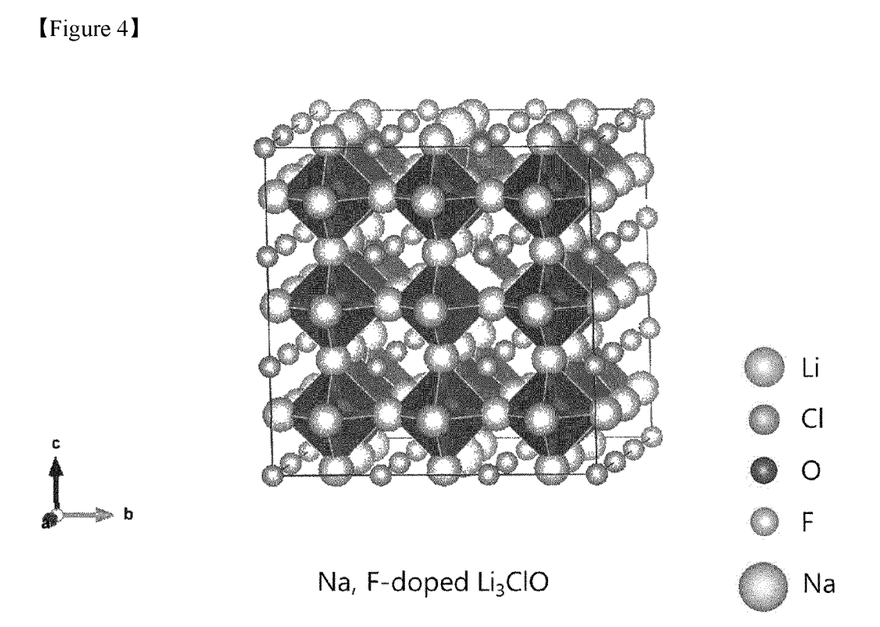
FIG. 4 is a schematic diagram showing a crystal structure in which Li and O are substituted with a Na cation and an F anion, respectively.
Figure 5:
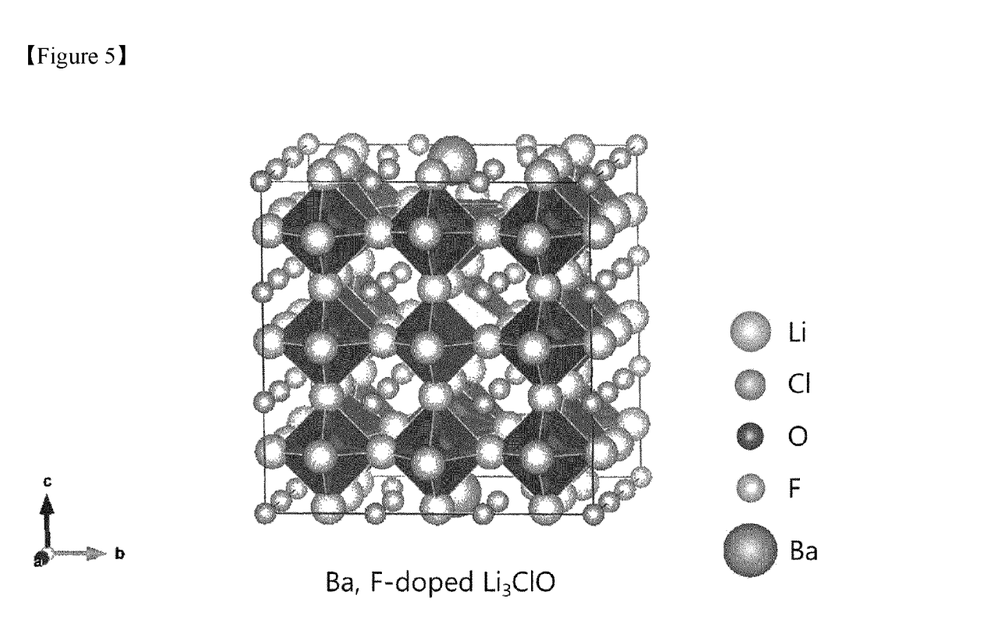
FIG. 5 is a schematic diagram showing a crystal structure in which Li and O are substituted with a Ba cation and an F anion, respectively.

The $Li_3OCl$ compound having a crystal structure as shown in FIG. 1 and the $(Li,M)_3OCl$ compound having a crystal structure as shown in FIG. 2 is substituted with cations provided below, and doped with an anion. In this case, a change in band gap is calculated with respect to $Li_3OCl$, and the resulting compound is shown in FIG. 3.

Cations:
Monovalent cations: Na, K, Rb, and Cs
Bivalent cations: Mg, Ca, Sr, and Ba
Trivalent cations: B, Al, Ga, In, Sc, Y, and La
Tetravalent cations: Si, Ge, Ti, Zr, and Hf
Anion:
O sties: F, Cl, Br, and I In the candidates, each of the cations is an element substituted for Li, and the anion is an element substituted for O.

To calculate the band gap, VASP (version 5.3.5) was used as a density functional theory (DFT) code based on projector augmented waves (PAWs). In this case, an electron has a kinetic energy cutoff of 500 eV, and an exchange-correlation function uses GGA (PBE).

A k-point mesh for supercell calculation is considered to include gamma points, and the optimization of the atomic structure is carried out using a conjugate gradient method until a force between atoms reaches ±0.01 eV/A. A difference in energy between the conduction band minimum (CBM) and the valence band maximum (VBM) at a gamma point of the optimized structure corresponds to a band gap.

Figure 6:
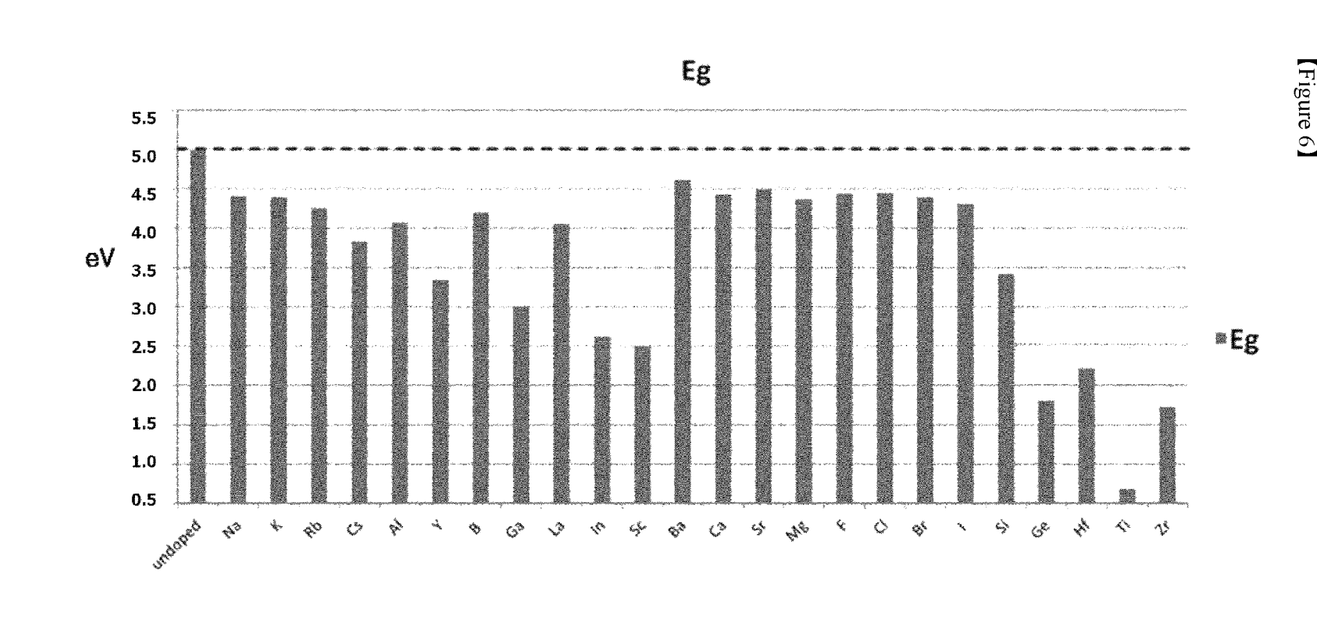
FIG. 6 is a graph of comparing the results of a change in band gap of a LiRAP compound according to a dopant.

FIG. 6 is a graph of comparing the results of a change in band gap of a LiRAP compound according to a dopant. In this case, the GGA-PBE band gap tends to be underestimated, compared to an actual band gap. As shown in FIG. 6, because values of the GGA-PBE band gap are slightly different from those of the actual band gap, only a relative comparison with respect to $Li_3OCl$ rather than a quantitative numerical change is judged to be significant. In this case, when an insulating material has a GGA-PBE band gap of 3.0 eV or less, the insulating material is judged to have very low electrical conductivity.

Referring to FIG. 6, when Li is substituted with other elements, all the band gaps tend to decrease with respect to the $Li_3ClO$. Also, Na, K, Rb, Al, B, La, Ba, Ca, Sr, Mg, F (substituted with O), Cl (substituted with O), Br (substituted with O), and I (substituted with O), in which a decrease in the band gap is relatively small, may be preferred dopants. Also, when Li is substituted with the tetravalent cations, a concentration of the Li vacancy tends to increase but the band gaps tend to significantly decrease.

For a change in lithium ion conductivity with the change in the band gap, activation energy (Eg) for lithium ion migration is calculated.

The activation energy is calculated by calculating a nudged elastic band (NEB), and five images, which are obtained by dividing a space between an initial structure before migration of Li+ ions and a final structure after the migration of Li+ ions by equidistant intervals, are used to model migration of Li+ ions in a [110] crystal direction. The NEB calculation is carried out using VASP (version 5.3.5) that is a PAW-based DFT calculation code.

The activation energy is transferred to a Li—O interstitial site by means of the dopant. In this case, the activation energy required accordingly may be measured using VASP that is a density functional theory-based code.

Figure 7:
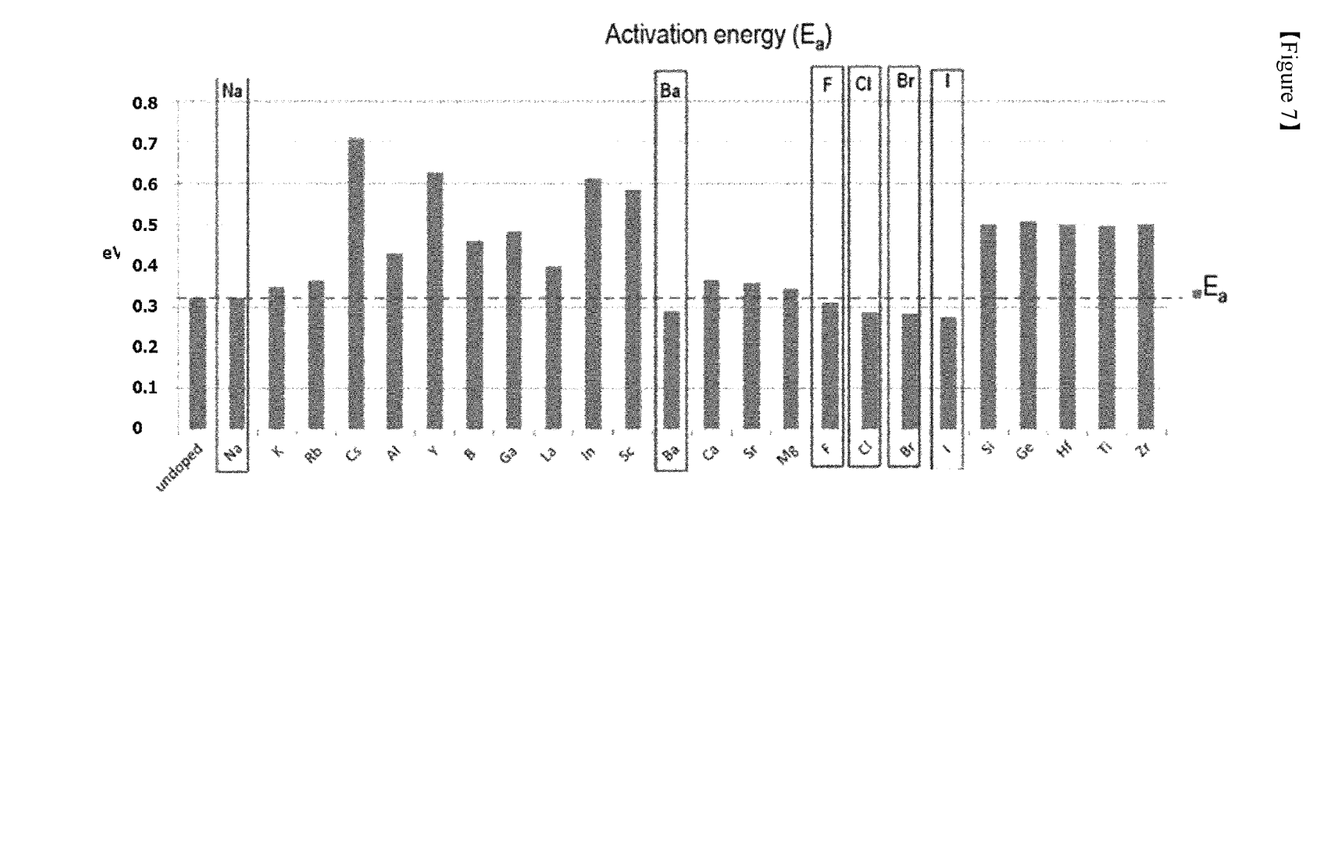
FIG. 7 is a graph of comparing the results of activation energy of the LiRAP compound with respect to migration of lithium ions according to the dopant.
Figure 8:
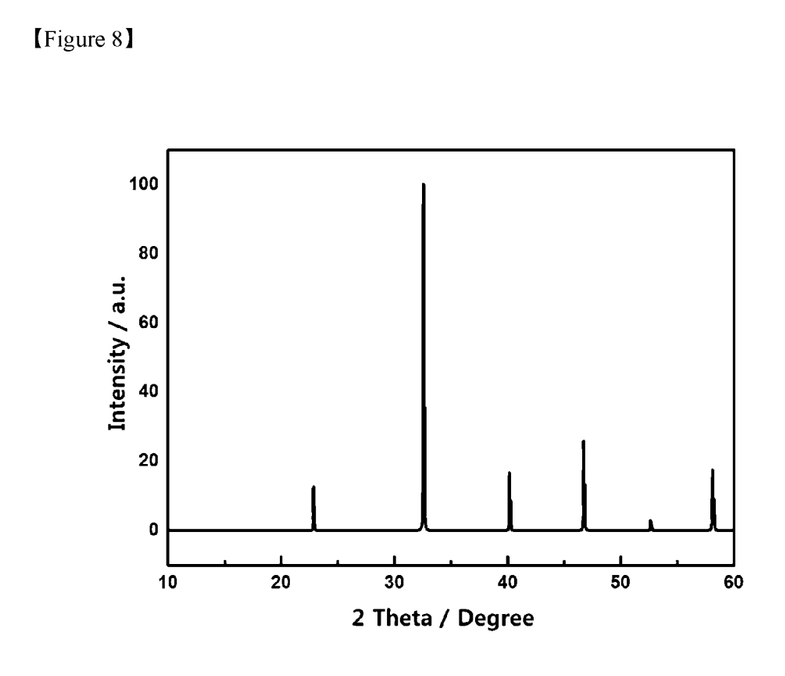
FIG. 8 shows the X-ray diffraction (XRD) spectra of $Li_3ClO$ according to one exemplary embodiment of the present invention.
Figure 9:
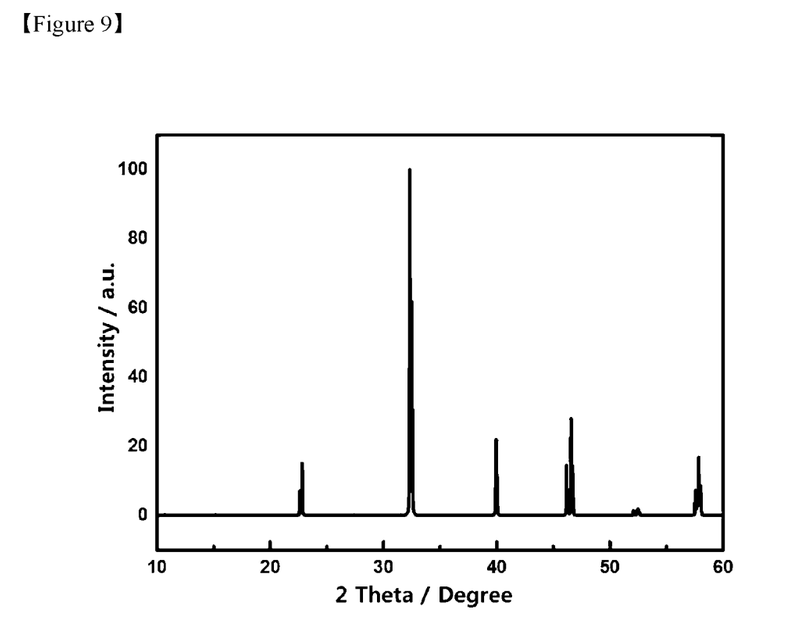
FIG. 9 shows the XRD spectra of $Li_{2.963}ClO_{0.963}F_{0.037}$ according to one exemplary embodiment of the present invention.
Figure 10:
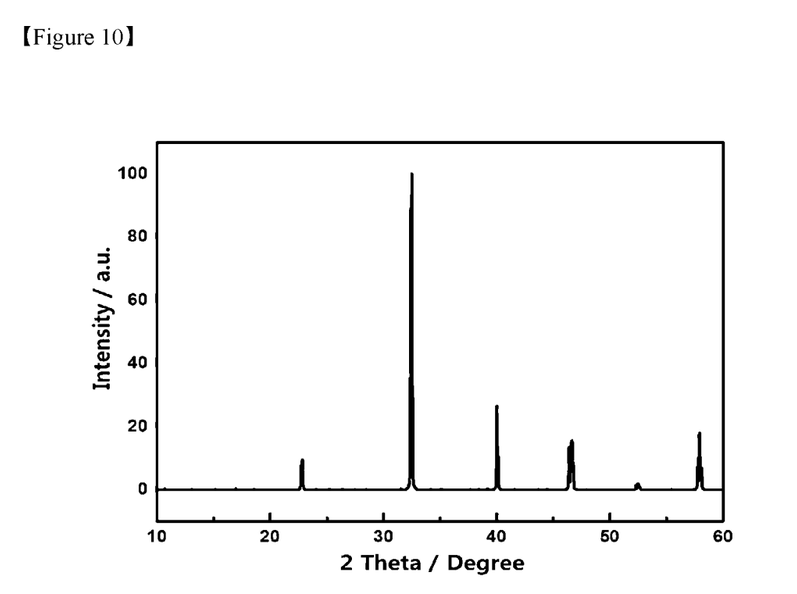
FIG. 10 shows the XRD spectra of $Li_{2.926}Na_{0.037}ClO_{0.963}F_{0.037}$ according to one exemplary embodiment of the present invention.
Figure 11:
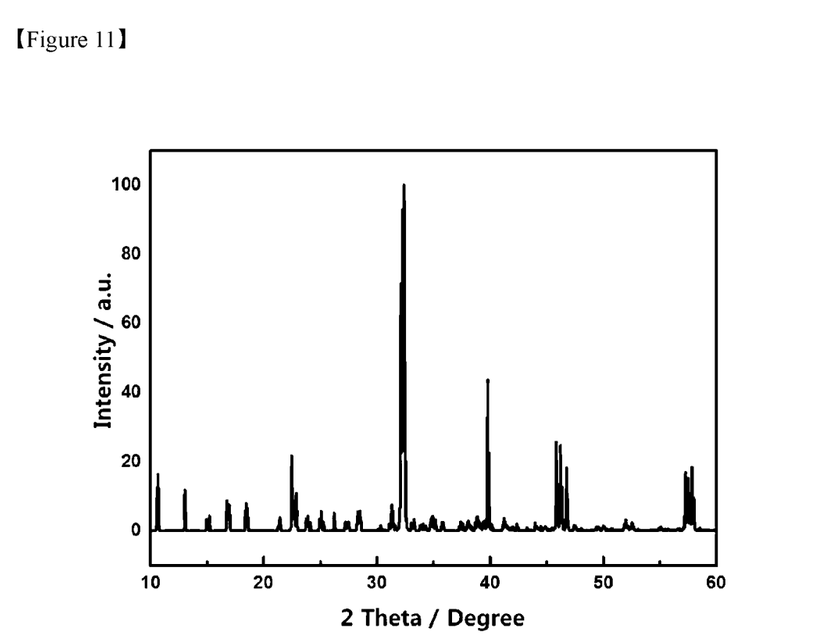
FIG. 11 shows the XRD spectra of $Li_{1.889}Ba_{0.037}ClO_{0.963}F_{0.037}$ according to one exemplary embodiment of the present invention.

FIG. 7 is a graph of comparing the results of a change in activation energy of the LiRAP compound with respect to migration of lithium ions according to the dopant.

Referring to FIG. 7, it is revealed that $Li_3ClO$ has an activation energy Ea of 0.323 eV, the value of which is similar to an experimental value (0.36 eV) reported in the prior-art documents. Only the six elements such as Ba, Na, F (substituted with O), Cl (substituted with O), Br (substituted with O), and I (substituted with O) have energy lower than the $Li_3ClO$.

Also, when the monovalent and bivalent cations are substituted for a Li site, or the monovalent anion are substituted for an O site, the Ea with respect to the Li+ migration tends to be similar or lower.

Therefore, the LiRAP compounds doped or substituted with Na (substituted with Li), Ba (substituted with Li), F (substituted with oxygen), Cl (substituted with oxygen), Br (substituted with oxygen), and I (substituted with oxygen) may have high ion conductivity, compared to the undoped $Li_3ClO$.

In summary, from the results of the band gap and the activation energy for lithium ion migration as shown in FIGS. 6 and 7, it can be seen that the LiRAP has a high band gap and low activation energy when the halogen element, that is, F, Cl, Br or I, is substituted for an anionic O site represented by Formula 1, 2 or 3 rather than Cl in the LiRAP, as known in the art. Also, it can be seen that, even when some of the Li cations are substituted with Na or Ba cations, the LiRAP may have lower activation energy, compared to before the LiRAP is doped with the cations.

The preparation of the LiRAP compound of Formula 1, 2 or 3 according to the present invention is not particularly limited.

According to one exemplary embodiment of the present invention, the LiRAP compound is prepared by mixing a lithium precursor ($LiNO_3$) and Li Hal to synthesize a lithium oxyhalide (e.g., $Li_{1.963}O_{0.963}F_{0.037}$); and annealing a mixture in which LiCl is added to the lithium oxyhalide at a high temperature of 180 to 900° C.

In this case, the compound represented by Formula 2 or 3 may be prepared by adding a metal-containing precursor at the first step. The precursor may include chlorides, nitrides, hydroxides, oxyhydroxides, alkoxides, and amides of the metal. Preferably, an alkoxide may be used.

Also, when the compound of Formula 2 or 3 is synthesized using metal-containing precursor, the synthesis method is not particularly limited.

For example, the metal-containing precursor may be added at the step of synthesizing the lithium oxyhalide or annealing the mixture at a high temperature to synthesize the compound of Formula 2 or 3.

According to another exemplary embodiment of the present invention, a $Li_3OCl$ powder may react with HX (X=halide) to prepare the LiRAP compound of Formula 1, or a M precursor may react with a Li precursor to prepare $(Li,M)_3OCl$ and the $(Li,M)_3OCl$ may react with HX (X=halide) to prepare the LiRAP compound of Formula 2 or 3.

Lithium Secondary Battery

The LiRAP compound of Formula 1, 2 or 3 may be applied to lithium secondary batteries due to high ion conductivity.

A lithium secondary battery includes a positive electrode, a negative electrode, and an electrolyte interposed between the positive and negative electrodes. In this case, the LiRAP compound of Formula 1, 2 or 3 is used as the electrolyte.

Because the LiRAP compound satisfies all characteristics such as an electrochemically stable potential window, low electrical conductivity, high-temperature stability, low toxicity, and the like, and simultaneously exhibits high lithium ion conductivity, compared to the conventional structure in which the dopant is substituted with Cl, the LiRAP compound is preferably used as the electrolyte of the battery to improve performance and thermal stability of the battery.

When used as the electrolyte, the LiRAP compounds of Formulas 1, 2 and 3 may be used alone or in combination thereof, and may be used after the LiRAP compounds are mixed to have various combinations of M and X.

Further, the electrolyte may further include a material used for this purpose in order to further enhance the lithium ion conductivity.

For example, the electrolyte may further include lithium salts such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic lithium carboxylate, 4-phenyl lithium borate, lithium imide, and the like.

Also, the electrolyte may further include an inorganic solid electrolyte or an organic solid electrolyte. The inorganic solid electrolyte is a ceramic-based material. In this case, a crystalline or amorphous material may be used as the inorganic solid electrolyte, and inorganic solid electrolytes such as Thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SaO_2$, $Li_2O$—$B_2O_3$, $Li_3PO_4$, $Li_2O$—$Li_2WO_4$—$B_2O_3$, LiPON, LiBON, $Li_2O$—$SaO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (w is w<1), $Li_{3.6}Si_{0.6}P_{0.4}O_4$, and the like may also be used.

Examples of the organic solid electrolyte that may be used may include mixtures of the lithium salts with polymeric materials such as a polyethylene derivative, a polyethylene oxide derivative, a polypropylene oxide derivative, a phosphate ester polymer, polyagitation lysine, polyester sulfide, polyvinyl alcohol, polyvinylidene fluoride, and the like. In this case, the aforementioned components may be used alone or in combination of two or more.

Also, the LiRAP compounds may be prepared in a powdery phase, and then compressed to prepare a pellet, which is applied as the solid electrolyte, or the LiRAP compounds may be mixed with known materials such as a binder, and applied in the form of a thick film subjected to slurry coating. When necessary, the LiRAP compounds may also be applied as the electrolyte in the form of a thin film subjected to a deposition process such as sputtering, and the like.

Specific methods for applications as the electrolyte are not particularly limited in the present invention, and methods known by a person having ordinary skill in the related art may be chosen or selected for applications.

In the lithium secondary battery in which the LiRAP compound of Formula 1, 2 or 3 is applicable as the electrolyte, a positive electrode or a negative electrode is not limited. In particular, the positive or negative electrode may be applied to lithium-air batteries, lithium oxide batteries, lithium-sulfur batteries, lithium metal batteries, and all-solid-state batteries, all of which are operated at a high temperature.

The positive electrode of the lithium secondary battery may include a lamellar compound or a compound substituted with one or more transition metals, such as lithium cobalt oxide ($LiCoO_2$), lithium nickel oxide ($LiNiO_2$), and the like; lithium manganese oxides such as Formula $Li_{1+x}Mn_{2-x}O_4$ ($0 \leq x \leq 0.33$), $LiMnO_3$, $LiMn_2O_3$, $LiMnO_2$, and the like; a lithium copper oxide ($Li_2CuO_2$); vanadium oxides such as $LiV_3O_8$, $LiFe_3O_4$, $V_2O_5$, $Cu_2V_2O_7$, and the like; an Ni-site-type lithium nickel oxide represented by the formula $LiNi_{1-x}M_xO_2$ (where M is Co, Mn, Al, Cu, Fe, Mg, B or Ga; $0.01 \leq x \leq 0.3$); a lithium-manganese complex oxide represented by the formula $LiMn_{2-x}M_xO_2$ (where M is Co, Ni, Fe, Cr, Zn or Ta; $0.01 \leq x \leq 0.1$) or $Li_2Mn_3MO_8$ (where M is Fe, Co, Ni, Cu or Zn); a lithium-manganese complex oxide having a spinel structure represented by $LiNi_xMn_{2-x}O_4$; $LiMn_2O_4$ in which some of Li ions in the formula are substituted with alkaline earth metal ions; a disulfide compound; $Fe_2(MoO_4)_3$, and the like, but the present invention is not limited thereto.

Such a positive electrode active material may be formed on a positive electrode current collector. The positive electrode current collector is not particularly limited as long as the positive electrode current collector has conductivity without causing a chemical change in the corresponding battery. For example, stainless steel, aluminum, nickel, titanium, baked carbon, or aluminum or stainless steel whose surface is surface-treated with carbon, nickel, titanium, silver, and the like may be used. In this case, the positive electrode current collector may be used in various forms of films, sheets, foil, nets, porous materials, foams, nonwoven fabrics, and the like, all of which have fine irregularities formed on a surface thereof, to enhance adhesion to the positive electrode active material.

Also, in the negative electrode, a negative electrode mixture layer including a negative electrode active material is formed on a negative electrode current collector, or a negative electrode mixture layer (e.g., lithium foil) is used alone.

In this case, types of the negative electrode current collector or the negative electrode mixture layer are not particularly limited in the present invention. In this case, known materials may be used herein.

In addition, the negative electrode current collector is not particularly limited as long as the negative electrode current collector has high conductivity without causing a chemical change in the corresponding battery. For example, copper, stainless steel, aluminum, nickel, titanium, baked carbon, or copper or stainless steel whose surface is surface-treated with carbon, nickel, titanium, silver, and the like, an aluminum-cadmium alloy, and the like may be used. Like the positive electrode current collector, the negative electrode current collector may also be used in various forms of films, sheets, foil, nets, porous materials, foams, nonwoven fabrics, and the like, all of which have fine irregularities formed on a surface thereof.

Further, the negative electrode active material may include carbon-based materials selected from the group consisting of crystalline artificial graphite, crystalline natural graphite, amorphous hard carbon, poorly crystalline soft carbon, carbon black, acetylene black, ketjen black, Super-P, graphene, and fibrous carbon; Si-based materials; metal complex oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, or Ge; Me': Al, B, P, Si, elements of the groups 1, 2, and 3 of the periodic table, or a halogen; $0 \leq x \leq 1$; $1 \leq y \leq 3$; and $1 \leq z \leq 8$), and the like; lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, and the like; conductive polymers such as polyacetylene, and the like; Li—Co—Ni-based materials; titanium oxides; lithium titanium oxides, and the like, but the present invention is not limited thereto.

In addition, metal complex oxides such as $SnxMe_{1-x}Me'_yO_z$ (Me: Mn, Fe, Pb, or Ge; Me': Al, B, P, Si, elements of the groups 1, 2, and 3 of the periodic table, or a halogen; $0 < x \leq 1$; $1 \leq y \leq 3$; and $1 \leq z \leq 8$), and the like; oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, and the like may be used as the negative electrode active material. In this case, carbon-based negative electrode active materials such as crystalline carbon, amorphous carbon, or a carbon complex may be used alone or in combination of two or more.

In this case, the electrode mixture layer may further include a binder resin, a conductive material, a filler, and other additives.

The binder resin is used to bind a conductive material to an electrode active material and used to bind to a current collector. Examples of such a binder resin may include polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene polymer (EPDM), sulfonated EPDM, a styrene-butadiene rubber, a fluorocarbon rubber, and various copolymers thereof.

The conductive material is used to further enhance conductivity of the electrode active material. Such a conductive material is not particularly limited as long as the conductive material has conductivity without causing a chemical change in the corresponding battery. For example, graphite such as natural graphite or artificial graphite; carbon blacks such as carbon black, acetylene black, ketjen black, channel black, furnace black, lamp black, thermal black, and the like; conductive fibers such as a carbon fiber or a metal fiber; metal powders such as hydrofluorocarbon, aluminum, nickel powder, and the like; conductive whiskers such as zinc oxide, potassium titanate, and the like; conductive metal oxides such as titanium oxide, and the like; a polyphenylene derivative, and the like may be used.

The filler may be optionally used as a component for inhibiting expansion of an electrode, and is not particularly limited as long as the filler is a fibrous material without causing a chemical change in the corresponding battery. For example, olefinic polymers such as polyethylene, polypropylene, and the like; fibrous materials such as a glass fiber, a carbon fiber, and the like are used.

The manufacture of the electrode for lithium secondary batteries according to the present invention is not particularly limited, and is performed according to a conventional process of manufacturing a battery. For example, the electrode mixture layer and an electrode passivation layer are sequentially stacked on the electrode current collector.

A shape of the lithium secondary battery is not particularly limited. In this case, the lithium secondary battery may have various shapes such as cylindrical, laminated, and coin-type shapes.

Also, the present invention provides a battery module including the lithium secondary battery as a unit battery, and also provides a battery pack including the battery module.

The battery pack may be used as a power source of a medium/large device requiring high-temperature stability, long cycle characteristics, and high capacity characteristics.

Examples of the medium/large device may include power tools that are operated by power received from a battery motor; electric vehicles including an electric vehicle (EV), a hybrid electric vehicle (HEV), and a plug-in hybrid electric vehicle (PHEV); electric bicycles including an E-bike and an electric scooter; electric golf carts; and power storage systems, but the present invention is not limited thereto.

MODE FOR INVENTION

Hereinafter, preferred embodiments of the present invention will be described in order to aid in understanding the present invention. However, it should be understood that the description proposed herein is just a preferable example for the purpose of illustrations only. Therefore, it will be apparent to those skilled in the art that various changes and modifications can be made to the exemplary embodiments of the present invention without departing from the scope of the present invention, so it should be understood that the present invention covers all such changes and modifications provided they are within the scope of the appended claims and their equivalents.

EXAMPLES

Example 1: Preparation of $Li_{3-x}ClO_{1-x}Hal_x$
($Li_{2.963}ClO_{0.963}F_{0.037}$)

6.528 g of $LiNO_3$ powder and 0.048 g of LiF powder were dissolved in 100 mL of $HNO_3$ (0.1 M), and then reacted at room temperature for 12 hours in a reaction vessel. After the reaction, the reaction mixture was dried using a rotary evaporator and an electric oven. The dried powder was calcined at 900° C. for 3 days, and then cooled to room temperature at a rate of 3° C./min. The synthesized powder was washed several times with distilled water to remove unreacted materials, and re-calcined at 600° C. for an hour in the air. The synthesized material was hand-mixed with 2.1 g of LiCl powder to prepare a ground mixed powder. 3 mL of $H_2O$ was added to the mixed powder to prepare a mixture in a gel phase. Thereafter, the mixture was heat-treated under an oxygen atmosphere for 2 hours or more in a 600° C. autoclave, and then dried at the same temperature for approximately an hour to prepare $Li_{2.963}ClO_{0.963}F_{0.037}$.

Example 2: Preparation of $Li_{3-y-x}M_yO_{1-x}Hal_xCl$
($Li_{2.926}Na_{0.037}ClO_{0.963}F_{0.037}$)

6.451 g of $LiNO_3$ powder, 0.048 g of LiF powder, and 0.15 g of $Na(CH_3COO)$ powder were dissolved in 100 mL of $HNO_3$ (0.1 M), and then reacted at room temperature for 12 hours in a reaction vessel. After the reaction, the reaction mixture was dried using a rotary evaporator and an electric oven. The dried powder was calcined at 900° C. for 3 days, and then cooled to room temperature at a rate of 3° C./min. The synthesized powder was washed several times with distilled water to remove unreacted materials, and re-calcined at 600° C. for an hour in the air. The synthesized material was hand-mixed with 2.1 g of LiCl powder to prepare a ground mixed powder. 3 mL of $H_2O$ was added to the mixed powder to prepare a mixture in a gel phase. Thereafter, the mixture was heat-treated under an oxygen atmosphere for 2 hours or more in a 600° C. autoclave, and then dried at the same temperature for approximately an hour to prepare $Li_{2.926}Na_{0.037}ClO_{0.963}F_{0.037}$.

Example 3: Preparation of $Li_{3-2y-x}M_yO_{1-x}Hal_xCl$
($Li_{1.889}Ba_{0.037}ClO_{0.6963}F_{0.037}$)

6.325 g of $LiNO_3$ powder, 0.048 g of LiF powder, and 0.46 g of $Ba(CH_3COO)_2$ powder were dissolved in 100 mL of $HNO_3$ (0.1 M), and then reacted at room temperature for 12 hours in a reaction vessel. After the reaction, the reaction mixture was dried using a rotary evaporator and an electric oven. The dried powder was calcined at 900° C. for 3 days, and then cooled to room temperature at a rate of 3° C./min. The synthesized powder was washed several times with distilled water to remove unreacted materials, and re-calcined at 600° C. for an hour in the air. The synthesized material was hand-mixed with 2.1 g of LiCl powder to prepare a ground mixed powder. 3 mL of $H_2O$ was added to the mixed powder to prepare a mixture in a gel phase. Thereafter, the mixture was heat-treated under an oxygen atmosphere for 2 hours or more in a 600° C. autoclave, and then dried at the same temperature for approximately an hour to prepare $Li_{1.889}Ba_{0.037}ClO_{0.963}F_{0.037}$.

Experimental Example 1: X-ray Peak Simulation Analysis

A first-principles calculation method based on the density functional theory (DFT) was used to calculate an optimal structure of a material in which F is substituted for an O site. First, a unit cell of $Li_3ClO$ was enlarged 3-fold in x-axis, y-axis, and z-axis directions to form a 3×3×3 supercell, and oxygen at the (0.5, 0.5, 0.5) position was then substituted with F. One of lithium atoms present in the vicinity of F substituted for the charge balance was removed to form a lithium vacancy. A structure used for calculation is as shown in the drawings, and has a formula of $Li_{79}Cl_{27}O_{26}F_1$. As a plane wave-based density functional theory code, VASP was used for structural optimization, and an exchange correlation for simulating an electron-electron interaction in the calculation used the generalized gradient approximation (GGA) of Perdew-Burke-Ernzerhof (PBE) function. In this case, an electron had a kinetic energy cutoff of 400 eV, and energy smearing was performed using a Gaussian method. A k-point mesh in a reciprocal lattice space to calculate energy (eigenvalue) of the electron used a requirement by which the k-point mesh includes gamma-points, and the calculations were repeated until a force acting between all atoms reached less than 0.01 eV/Å. An X-ray peak simulation was performed based on the structure thus optimized. FIGS. 8, 9, 10, and 11 show the XRD peak spectra of $Li_3ClO$, $Li_{2.963}ClO_{0.963}F_{0.037}$, $Li_{2.926}Na_{0.037}ClO_{0.963}F_{0.037}$, and $Li_{1.889}Ba_{0.037}ClO_{0.963}F_{0.037}$ calculated by the method.

The invention claimed is:

1. A compound having a lithium-rich antiperovskite (Li-RAP) crystal structure represented by the following Formula 1, 2 or 3:

$Li_{3-x}ClO_{1-x}Hal_x$     [Formula 1]

wherein Hal is F, Cl, Br, or I, and x is 0<x<1;

$Li_{3-y-x}M_yO_{1-x}Hal_xCl$     [Formula 2]

wherein M is Na, K, Rb, or Cs, Hal is F, Cl, Br, or I, and x and y are 0<x<1 and 0<y<2;

$Li_{3-2y-x}M_yO_{1-x}Hal_xCl$     [Formula 3]

wherein M is Mg, Ca, Sr, or Ba, Hal is F, Cl, Br, or I, and x and y are 0<x<1 and 0<y<1.

2. The compound of claim 1, wherein the compound has an ion conductivity of 10 to $10^{-10}$ S/cm.

3. An electrolyte for lithium secondary batteries comprising the compound having a lithium-rich antiperovskite (Li-RAP) crystal structure represented by the following Formula 1, 2 or 3:

$Li_{3-x}ClO_{1-x}Hal_x$     [Formula 1]

wherein Hal is F, Cl, Br, or I, and x is 0<x<1;

$Li_{3-y-x}M_yO_{1-x}Hal_xCl$     [Formula 2]

wherein M is Na, K, Rb, or Cs, Hal is F, Cl, Br, or I, and x and y are 0<x<1 and 0<y<2;

$Li_{3-2y-x}M_yO_{1-x}Hal_xCl$     [Formula 3]

wherein M is Mg, Ca, Sr, or Ba, Hal is F, Cl, Br, or I, and x and y are 0<x<1 and 0<y<1.

4. The electrolyte of claim 3, wherein the compound has an ion conductivity of 10 to $10^{-10}$ S/cm.

5. A lithium secondary battery comprising the electrolyte for lithium secondary batteries defined in claim 3.

6. The lithium secondary battery of claim 5, wherein the lithium secondary battery comprises one selected from a lithium-air battery, a lithium oxide battery, a lithium-sulfur battery, a lithium metal battery, and an all-solid-state battery.

* * * * *